US009602982B2

(12) United States Patent
Turakhia

(10) Patent No.: US 9,602,982 B2
(45) Date of Patent: *Mar. 21, 2017

(54) SYSTEM AND METHOD FOR ENSURING A COMMUNICATION IS INITIATED FROM WITHIN A COMMUNICATION APPLICATION

(71) Applicant: Riva FZC, Ras Al Khaimah (AE)

(72) Inventor: Bhavin Turakhia, Mumbai (IN)

(73) Assignee: Riva FZC, Ras Al Khaimah (AE)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,205

(22) Filed: Jun. 3, 2014

(65) Prior Publication Data

US 2015/0140958 A1 May 21, 2015

Related U.S. Application Data

(63) Continuation-in-part of application No. 14/148,361, filed on Jan. 6, 2014.

(30) Foreign Application Priority Data

Nov. 19, 2013 (IN) .......................... 3618/MUM/2013
Feb. 5, 2014 (IN) ............................ 396/MUM/2014

(51) Int. Cl.
*H04M 11/00* (2006.01)
*H04W 4/12* (2009.01)
(Continued)

(52) U.S. Cl.
CPC .............. *H04W 4/12* (2013.01); *H04M 15/61* (2013.01); *H04M 15/8044* (2013.01); *H04W 4/24* (2013.01)

(58) Field of Classification Search
CPC ..... H04W 4/12; H04W 4/16; H04W 52/0225; H04L 67/26; H04L 12/18; H04L 12/1813
(Continued)

(56) References Cited

U.S. PATENT DOCUMENTS 6,104,704 A * 8/2000 Buhler et al. ................. 370/252
7,839,987 B1 11/2010 Kirchhoff et al.
(Continued)

FOREIGN PATENT DOCUMENTS

WO WO-02098120 A1 12/2002
WO WO-2013055259 A3 4/2013
WO WO-2013081611 A1 6/2013

OTHER PUBLICATIONS

"U.S. Appl. No. 14/148,361, Non Final Office Action mailed May 15, 2015", 9 pgs.
(Continued)

*Primary Examiner* — Kwasi Karikari
(74) *Attorney, Agent, or Firm* — Schwegman Lundberg & Woessner, P.A.

(57) ABSTRACT

In example embodiments, a system and method for ensuring that a communication is made from within a communication application is provided. A communication initiated from a device of a user is received. A determination is made as to whether a notification is received from the communication application on the device of the user. Based on the notification being received from the device of the user, a determination is made as to whether the notification provides an indication that the communication was made from within a communication application. A notice may be provided to the user based on the communication being made from outside the communication application or the user may be charged a different rate.

30 Claims, 8 Drawing Sheets

(51) Int. Cl.
*H04W 4/24* (2009.01)
*H04M 15/00* (2006.01)

(58) Field of Classification Search
USPC .......................................................... 455/406
See application file for complete search history.

(56) References Cited

U.S. PATENT DOCUMENTS

| 8,509,742 B2 | 8/2013 | Gopinath et al. |
| 2008/0016162 A1* | 1/2008 | Meentzen ............... H04L 12/58 709/206 |
| 2012/0094642 A1 | 4/2012 | Pöpperl et al. |
| 2012/0204191 A1* | 8/2012 | Shia ....................... G06Q 10/10 719/318 |
| 2015/0140973 A1 | 5/2015 | Turakhia |

OTHER PUBLICATIONS

"International Application Serial No. PCT/IN2014/000340, International Search Report mailed Feb. 6, 2015", 3 pgs.
"International Application Serial No. PCT/IN2014/000340, Written Opinion mailed Feb. 6, 2015", 4 pgs.
"International Application Serial No. PCT/IN2014/000342, International Search Report mailed Dec. 30, 2014", 3 pgs.
"International Application Serial No. PCT/IN2014/000342, Written Opinion mailed Dec. 30, 2014", 5 pgs.
"U.S. Appl. No. 14/148,361, Non Final Office Action mailed Oct. 8, 2015", 9 pgs.
"U.S. Appl. No. 14/148,361, Response filed Jul. 15, 2015 to Non Final Office Action mailed May 15, 2015", 8 pgs.

* cited by examiner

SYSTEM AND METHOD FOR ENSURING A COMMUNICATION IS INITIATED FROM WITHIN A COMMUNICATION APPLICATION

CROSS-REFERENCE TO RELATED APPLICATIONS

The present application claims the priority benefit under 35 U.S.C. §119 of Indian Patent Application No. 396/MUM/2014, filed on Feb. 5, 2014, and also is a continuation-in-part of and claims the priority benefit of, U.S. patent application Ser. No. 14/148,361, filed on Jan. 6, 2014, which in turn claims the priority benefit under 35 U.S.C. §119 of Indian Patent Application No. 3618/MUM/2013, filed on Nov. 19, 2013, all of which are incorporated herein by reference in their entirety.

FIELD

The present disclosure relates generally to network communication, and in a specific example embodiment, to ensuring that a communication is initiated from within a communication application.

BACKGROUND

Typically, when a mobile device, such as a smartphone, is used to conduct a call or send a message, a dialer application that was provided by the manufacturer of the mobile device at manufacturing time (also referred to a "native application") is used by default. However, the native application may be unable to provide certain functionalities or advantages that a carrier-branded application or third party application may be able to provide. While some companies may partner with the manufacturer to lock the mobile device or substitute the default dialer, a problem with this approach is that the carrier or third party has to preemptively strike a deal with all manufacturers. This may be unrealistic.

BRIEF DESCRIPTION OF DRAWINGS

Various ones of the appended drawings merely illustrate example embodiments of the present invention and cannot be considered as limiting its scope.

DETAILED DESCRIPTION

Figure 1:
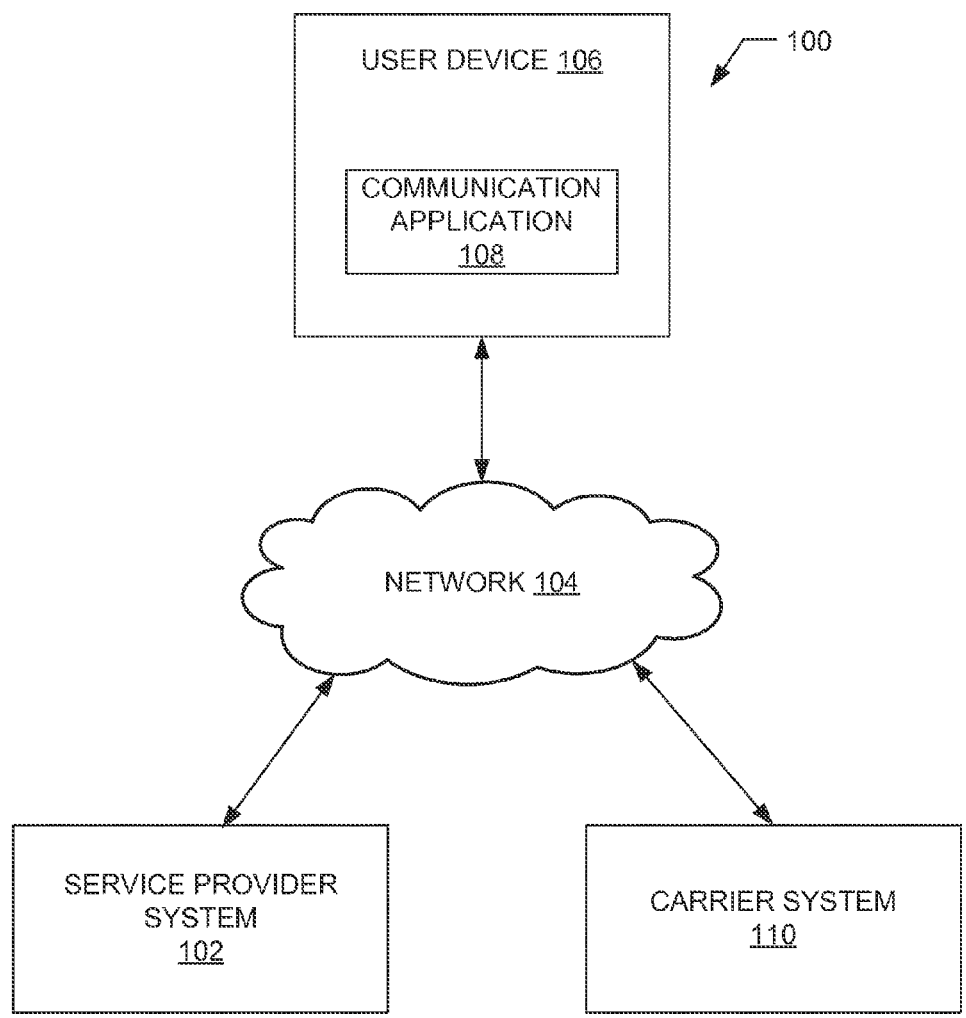
FIG. 1 is a diagram illustrating an example environment in which embodiments of a system for managing contacts in a network may be implemented.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for ensuring that a communication is initiated from within a communication application. The communication may be a voice communication (e.g., a live telephone call or a voicemail), a text communication (e.g., a text message, chat message, or instant message), or any other type of communication (e.g., a photo or video being shared) that can be initiated by a device of a user. In example embodiments, an indication of a communication made from the device of the user is received by a carrier system. Communication details for the communication may be accessed from the carrier system by a service provider system. In some embodiments, the service provider and the carrier system maybe one and the same. A determination is made as to whether a notification is received b the service provider system from the device of the user. Based on the notification being received from the device of the user or based on information contained within the notification, a determination is made as to whether the notification provides an indication that the communication was initiated from within a communication application. In some embodiments, the determination is made by comparing the information contained within the notification with the communication details accessed from the carrier system. In some cases, if the communication is not initiated from within the communication application, the communication may be dropped. In other cases, the communication may be initiated from outside of the communication application, and a notice may be provided to the user based on the communication being initiated from outside the communication application. This notice may inform the user of advantages of initiating the communication from within the communication application.

In example embodiments, the communication application may be preferred because the communication application can provide functionalities or advantages over a native or other application on the device. For example, the use of the communication application may provide a special rate on all international communications (e.g., calls, text messages, chat messages) such that whenever the user tries to initiate an international communication, the communication is first attempted over the Internet as opposed to using a cellular network or a public switched telephone network (PSTN). If the communication over the Internet is not available, then the system may fall back to the cellular network and/or the PSTN. Similar advantages also apply to using the communication application to initiate domestic communications. There may be other functionalities or capabilities that are provided by the communication application that allows the user to reduce their costs and accordingly, costs for a carrier or service provider that is providing the communication connection service to the user.

Furthermore, the communication application may provide enhanced functionalities that are not available via the native application. In one embodiment, the communication application may automatically translate a text communication based on a message receiver's language preference. Example embodiments may be able to determine a language preference, for example, by a device identifier (e.g., telephone number) of the message receiver (e.g., whether the identifier is an international number). Alternatively, example embodiments may access a profile of the message receiver, based on the message receiver being registered with a service provider associated with the communication application, and determined from the profile the message receiver's preferred language. Other enhanced functions may include, for example, transcription of communications, recording of communications, and maintaining a communication history.

With reference to FIG. 1, a diagram illustrating an example environment 100 in which embodiments of a system for ensuring a communication is initiated from within a communication application is provided. The environment 100 comprises a service provider system 102 coupled via a network 104 (e.g., the Internet, wireless network, cellular network, PSTN, or a Wide Area Network (WAN)) to a user device 106. The user device 106 is associated with a user that has downloaded or otherwise has an installed communication application 108 on their user device 106 that corresponds to the service provider system 102. The user device 106 may also have a native application for providing communication services. Thus, the user device 106 may comprise multiple applications for use in initiating a communication, and the user has an option to use any of the applications. The user device 106 may comprise a mobile phone, smartphone, laptop, tablet, or any other communication device that a user may utilize to store, access, or operate the communication application 108 in order to initiate a communication.

The communication application 108 comprises a piece of functionality on the user device 106 that provides functions or operations that allow the user of the user device 106 to initiate a communication. By using the communication application 108, the user may be provided enhanced communication features or discounted communications over communications made using a native application on the user device 106 (e.g., an application provided by the manufacturer of the user device 106). In some embodiments, the service provider system 102 may provide the communication application 108 to the user device 106 (e.g., provide a downloadable version of the service application, electronically send the service application to the user device 106, or physically send to the user via a storage medium such as a CD ROM).

Regardless of whether a communication is initiated from within the communication application 108 or outside of the communication application 108, the communication initiated by the user device 106 may be routed through a carrier system 110. The carrier system 110 may comprise a phone carrier or entity that has the capability to connect the user at the user device 106 to an intended communication recipient via a communication network (e.g., PSTN, Internet, cellular network).

It is noted that the environment 100 shown in FIG. 1 is exemplary. Alternative embodiments may comprise any number of user devices 106 in the environment 100. Furthermore, the service provider system 102 may be embodied within or otherwise owned by the carrier system 110 or vice versa. Accordingly, the functions and components of the service provider system 102 may be combined with the carrier system 110 in some embodiments.

Figure 2:
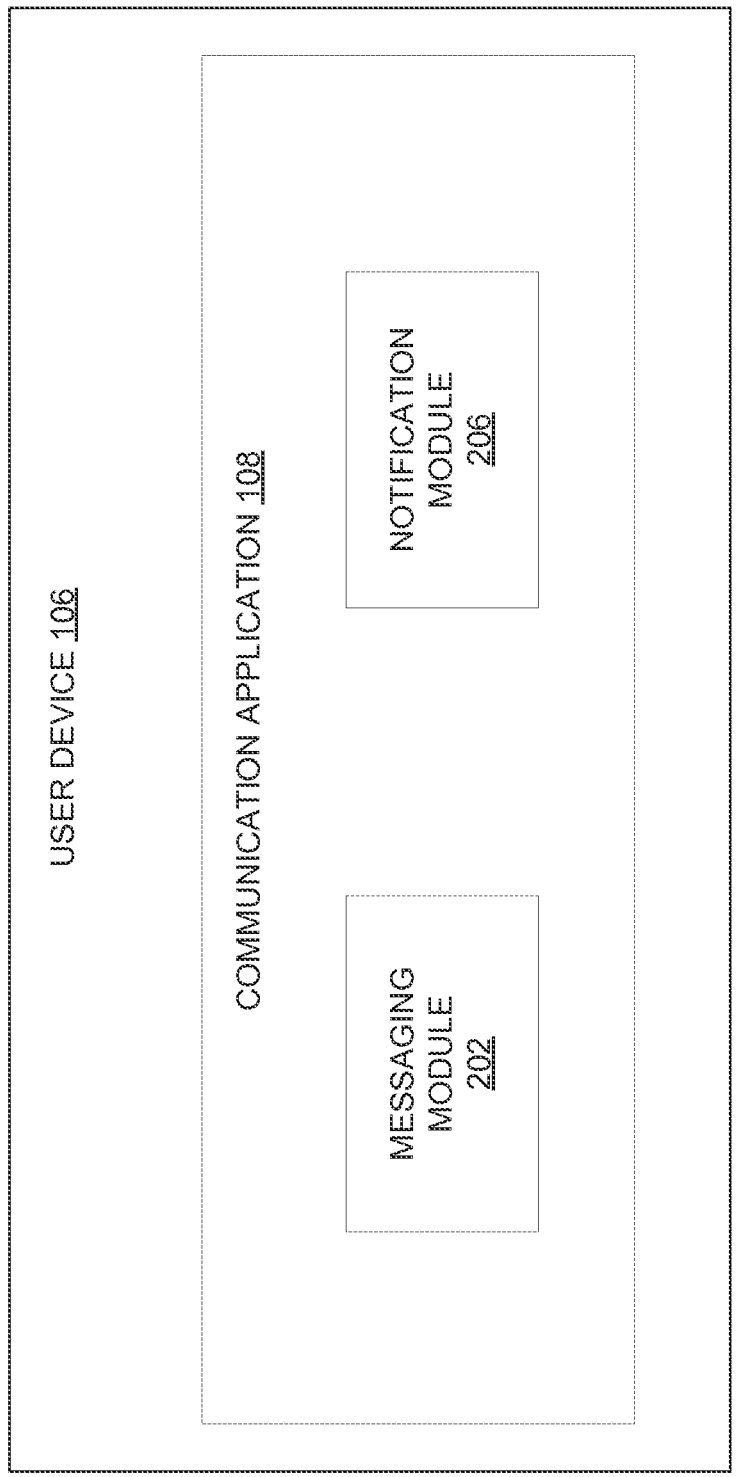
FIG. 2 is a block diagram illustrating an example embodiment of a client device.

Referring now to FIG. 2, a block diagram illustrating an example embodiment of the user device 106 is shown. The user device 106 is illustrated having the communication application 108 installed thereon. The communication application 108 may provide enhanced communication functionality and services to the user device 106. The communication application 108 also provides data to the service provider system 102 or the carrier system 110 that enables them to determine whether a communication attempt or a completed communication (collectively referred to as a "communication") by the user device 106 was initiated from within (e.g., using) the communication application 108. Accordingly, the communication application 108 may comprise a messaging module 202 and a notification module 206. It is noted that the communication application 108 may comprise other modules not pertinent to example embodiments that are not shown or discussed.

The messaging module 202 may direct communication attempts to the carrier system 110. Upon activation of the communication application 108, the messaging module 202 allows the user of the user device 106 to dial a number of a callee or select a number for the callee from stored contact information (e.g., from an address book). Once the number is entered and a call initiated (e.g., selecting a "dial" or "talk" button), the messaging module 202 may attempt to place the call via the carrier system 110. In some embodiments, the messaging module 202 may attempt to first route the call via the Internet, or via other lower cost routes, failing which it routes the call via the default carrier system 110.

Similarly with a text message, upon activation of the communication application 108, the messaging module 202 allows the user of the user device 106 to enter a number of a message recipient or select the message recipient from stored contact information (e.g., from an address book). Once the message recipient is selected and a communication initiated (e.g., typing a message and selecting a "send" button), the messaging module 202 may attempt to send the message via the carrier system 110. In some embodiments, the messaging module 202 may attempt to first route the message via the Internet, or via other lower cost routes, failing which it routes the communication via the default carrier system 110.

The notification module 206 provides a notification of communication details of one or more communications or one or more events to the service provider system 102. The communication details may include a number of a destination, call or message start time (collectively referred to as "communication start time"), call end time, call duration, the actual message or a derivative thereof, or any suitable combination thereof. Any communication initiated from within the communication application 106 should be known to the communication application 108 and details regarding this communication may be provided in a notification to the service provider system 102 or the carrier system 110. However, in some embodiments, communications initiated from outside the communication application 108 may or may not be explicitly known to the communication application 108.

In some embodiments, the notification module 206 may provide the notification in substantially real-time. That is, the notification may be sent prior to or with a communication attempted by the messaging module 202 or prior to or with any events recorded by the communication application 108. In other embodiments, the notification may be provided at a later time (e.g., after a communication has concluded or after an event is recorded). For example, the notification module 206 may send a batch notification comprising a plurality of communications initiated or a plurality of events over a predetermined period of time (e.g., last 6 hours) or when requested by the service provider system 102. For instance, the notification module 206 may receive a wake up notice at a scheduled time to send the notification (e.g., a notice instructing the communication application 108 to periodically send the notification in response to a scheduled task or via a push message).

Figure 3:
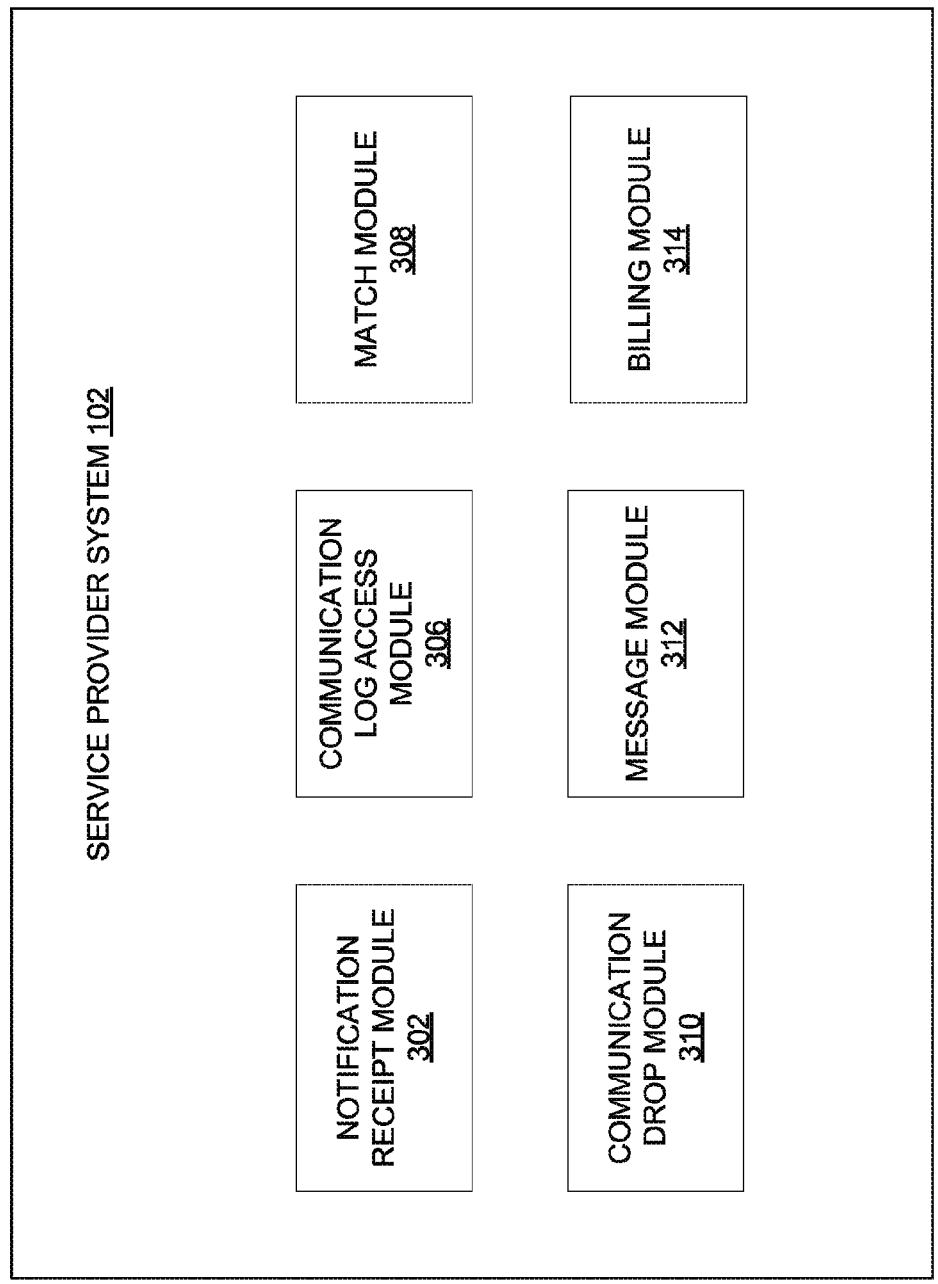
FIG. 3 is a block diagram illustrating an example embodiment of a service provider system.

Referring now to FIG. 3, the service provider system 102 is shown in more detail. In example embodiments, the service provider system 102 may comprise one or more servers that provide communication functionalities and services to users of the communication application 108. To enable these functionalities and services, the service provider system 102 may comprise a notification receipt module 302, a communication log access module 306, a match module 308, a communication drop module 310, a message module 312, and a billing module 314 coupled in communication with each other. The service provider system 102 may comprise other components not pertinent to example embodiments that are not shown or discussed. Furthermore, alternative embodiments may comprise more, less, or other modules for ensuring communications are initiated from within the communication application 108. Some functions of the modules may be combined or divided into two or more further modules.

The notification receipt module 302 receives or otherwise obtains the notification sent b the user device 106. In one embodiment, the notification comprises communication details of communications initiated by the user device 108 using the communication application 108. The communication details may include, for example, the number o destination, the communication start time, the call end time, the actual message or a derivative thereof, and the duration of each call. For text communications, the communication details may comprise the number (or identifier) of the destination, the actual message or a derivative thereof, and the communication start time. For voice communications, the communication details may comprise the number of the destination, the communication start time, the call end time, the actual message or a derivative thereof, and the duration of each call. some embodiments, the notification is sent in substantially real-time with occurrence of the communication, and the communication start time may be considered to be the time the notification was received.

In another embodiment, the notification may comprise events performed within (or using) the communication application 108 and a time each event occurred. Events may include, for example, opening the communication application 108, accessing or using a dialer or keyboard provided by the messaging module 202, accessing a chat window, and selecting a send or call button. Events may also comprise exit events such as exiting the communication application 108 or canceling a call before it is connected to the callee. In some embodiments, the notification may indicate an event but not a time. In these embodiments, the notification is sent in substantially real-time with the occurrence of the event. Therefore, the notification receipt module 302 may associate a time that the notification was received to the event in the notification and use that receipt time in determining whether a communication was initiated within a predetermined time period of the event.

In another embodiment, the notification may comprise communication details of communications initiated by the user device 108 outside the communication application 108. The communication details may include, for example, the number of the destination, the communication start time, the end time of the call, the actual message or a derivative thereof, and the duration of the call. In some embodiments, the notification is sent in substantially real-time with occurrence of the communication, and a start time of a communication maybe considered to be the time the notification was received.

The notification may be received in substantially real-time as a communication is being made or may be received in a batch format. A batch notification may be received when a certain number of communication have been made or at/after a predetermined time. For example, a component of the service provider system 102 may send a notice to the notification module 206 that may wake up the communication application 108 and trigger the communication application 108 to send the notification.

The communication log access module 306 accesses communication details or a communication log maintained at the carrier system 110. In example embodiments, since all communication are routed through the carrier system 110, the carrier system 110 maintains a record of all communication attempts initiated by the user device 106. The communication details maintained by the carrier system 110 may include details such as, for example, the number of the destination, communication start time, end time of the call, duration of the call, a communication message or a derivative of the communication message, or any suitable combination thereof. The communication log may comprise one or more entries of one or more communications received at the carrier system 110.

The match module 308 performs a comparison between the notification received from the user device 106 and the communication details of communications received by the carrier system 110 that corresponds to the user device 106 (e.g., a number or identifier of the user device 106) to determine whether each communication was initiated from within the communication application 108. In embodiments where the notification comprises communication details of one or more communications made using the communication application 108, the match module 308 compares the communication details in the notification to communication details of communications received by the carrier system 110 to find matches in the communication details. If a match is discovered, then the matching communication is determined to be initiated from within the communication application 108. However, if no match is determined (e.g., no notification received or no matching communication received by the carrier system), then the communication is deemed to be initiated from outside the communication application 108.

In embodiments where the notification comprises events, the match module 308 attempts to determine whether a communication received by the carrier system 110 was made within a predetermined threshold amount of time of an event that occurred at the communication application 108. In some cases, a communication occurring within the predetermined threshold amount of time of an event may indicate that the communication was initiated using the communication application 108. Alternatively if a communication is initiated outside of the predetermined threshold amount of time of an event, then the communication may be determined to be initiated from outside the communication application 108. Furthermore, in other embodiments, a communication occurring within a predetermined threshold amount of time after an exit event may indicate that the communication was initiated from outside the communication application 108 (e.g., using a native application of the user device 106). These embodiments will be discussed in more detail in connection with FIG. 6 below.

The communication drop module 310 determines whether a communication should be dropped. n some embodiments, when the match module 308 determines in real-time that the communication was initiated from outside the communication application 108, the communication drop module 310 may instruct the carrier system 110 to drop the communication to prevent the communication from being initiated from outside the communication application 108 (herein referred to a "non-communication application"). in some cases, a message may be provided by the message module 312 regarding the dropped communication. For example, the message may indicate that the communication was dropped and that a future communication should be initiated using the communication application 108.

In other embodiments, the communication initiated from outside the communication application 108 may not be dropped, and the user at the user device 106 is allowed to initiate and complete the communication using the non-communication application. However, the message module 312 may provide a message to the user device 106 indicating that the particular communication was initiated outside of the communication application 108 and suggest that future communication be initiated using the communication application 108. In some embodiments, the communications initiated from outside the communication application 108 may be charged at a different rate than communications initiated from within the communication application 108. For example, a communication initiated from outside the communication application 108 may be charged or billed at $0.02/minute while a communication initiated from within the communication application 108 may be charged or billed at $0.01/minute. In example embodiments, the billing module 314 may charge (or provide instructions to charge) the user a different rate for the communication initiated from outside the communication application than a rate charged for initiating the communication using the communication application.

Accordingly, the message module 312 manages sending messages to the user device 106 regarding communications that were not made using the communication application 108. The message may be sent, for example, using SMS, Internet, or e-mail or may comprise sending a USSD message or playing an audio message live on or after the communication (e.g., voicemail). In some embodiments, the message module 312 may be located at the carrier system 110.

In some embodiments, a determination of whether a threshold number of messages within a particular time period has been sent (e.g., five messages within 48 hours). The message module 312 may refrain from providing any further messages in response to the number of messages exceeding the threshold number of messages.

Figure 4:
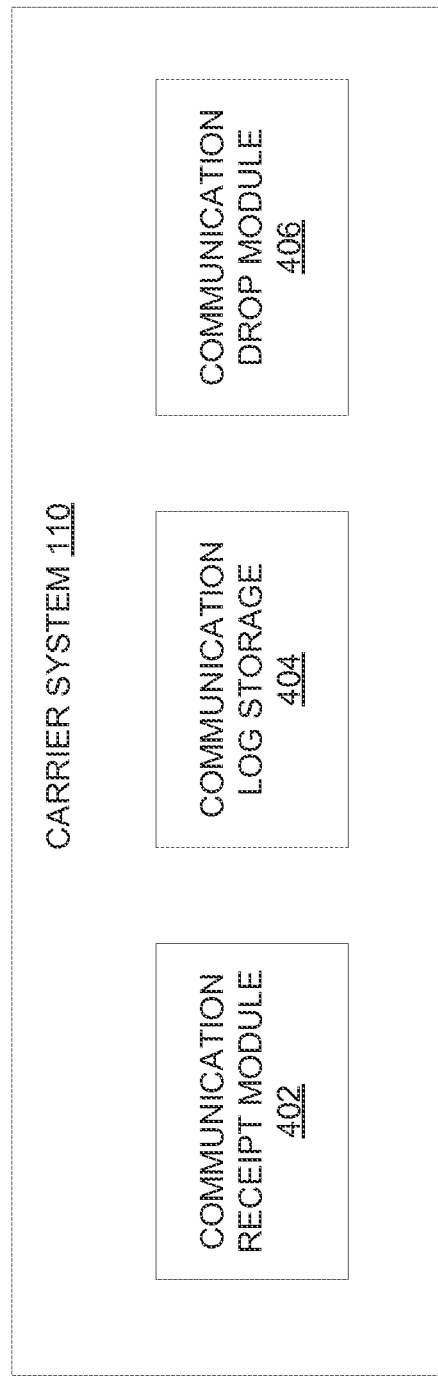
FIG. 4 is a block diagram illustrating an example embodiment of a carrier system.

FIG. 4 is a block diagram illustrating an example embodiment of the carrier system 110. The carrier system 110 manages communication connections, dropping of communications, and in some cases, providing messages during a communication (e.g., during a call). Accordingly, the carrier system 110 may comprise a communication receipt module 402, a communication log storage 404, and a communication drop module 406. It is noted that the carrier system 110 may comprise other modules not pertinent to example embodiments that are not shown or discussed.

The communication receipt module 402 receives the communication request from the user device 106. In some cases, the communication receipt module 402 may automatically connect the voice communication (e.g., call) or automatically send the text communication indicated in the communication request. The communication receipt module 402 may also create a log entry in the communication log storage 404 that records details of the communication request. The details may include, for example, one or more of a start, time of communication, an end time of call, a duration of call, or a number of the destination, or the actual message or a derivative thereof.

The communication drop module 406 may end or drop a communication based on receiving instructions from the communication drop module 310 of the service provider system 102 to drop the communication. In example embodiments, the communication drop module 310 of the service provider system 102 may determine that a communication is being initiated from outside the communication application 108 and provides instructions to the communication drop module 406 of the carrier system 110 to either drop the communication (e.g., a call that is already connected or a message that is being sent) or to not connect the call or send the communication indicated in the communication request. In some cases, the communication drop module 406 may provide a message (e.g., an audio message, SMS, text message, USSD message etc.) to the user informing the user the reason for dropping the communication.

Figure 5:
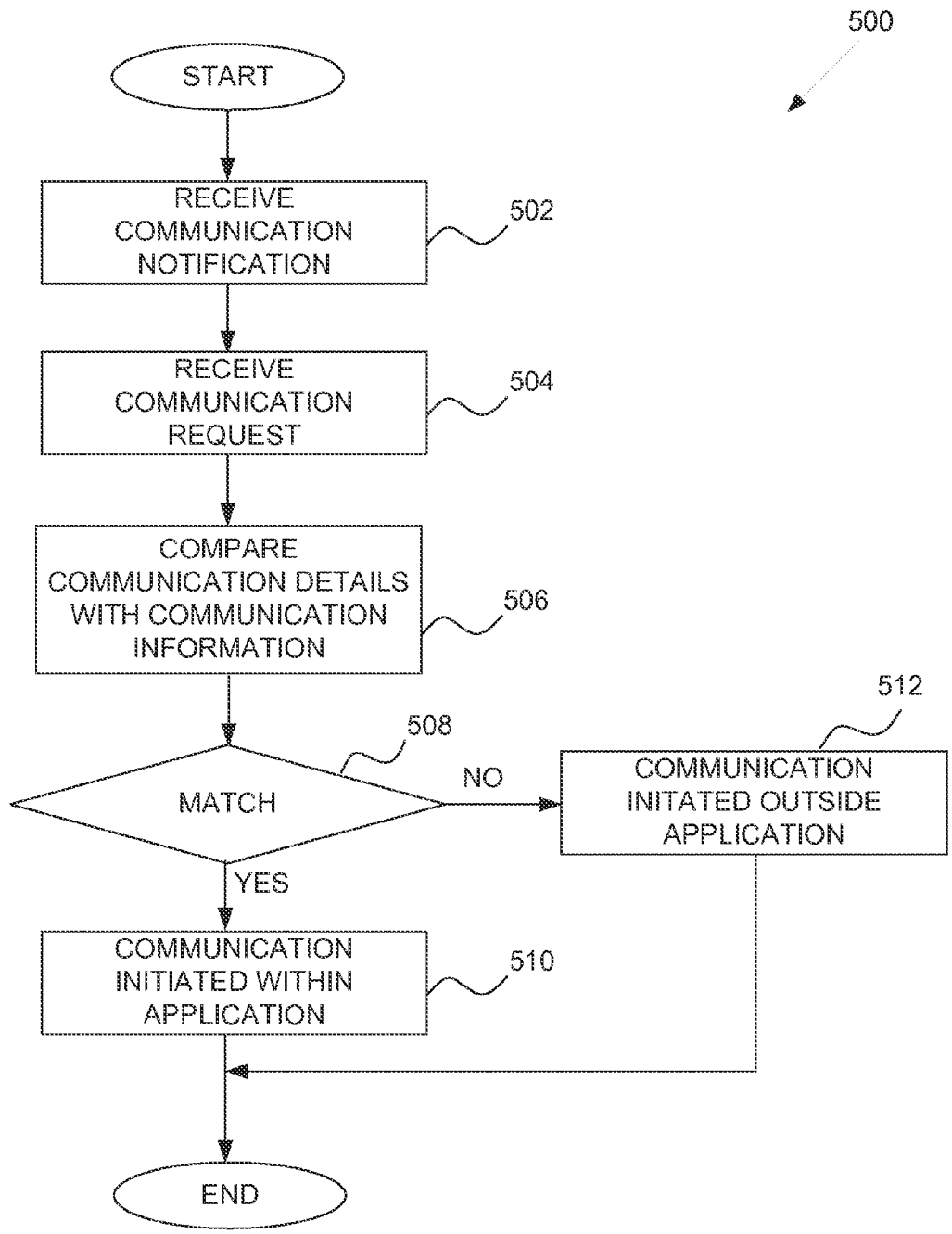
FIG. 5 is a flow diagram of an example method for determining whether a communication is initiated from within a communication application.

FIG. 5 is a flow diagram of an example method 500 for determining whether a communication is made from within the communication application 108. The operations of the method 500 may be performed by a combination of the service provider system 102 and the carrier system 110 which may be embodied on one or more servers. In operation 502, the notification receipt module 302 receives a notification from the user device 106. In the present embodiment, the notification comprises communication details of communication initiated using the communication application 108. In example embodiments, the notification may be sent over a network (e.g., Internet), or SMS request, or email to the notification receipt module 302.

In operation 504, a communication request is received from the user device 106 by the communication receipt module 402 of the carrier system 110. The communication request may include a number of the destination (e.g., callee or message recipient) and an identifier of the user device 106 (e.g., a number of the user device 106). In an embodiment where communications are completed (e.g., connected or sent) regardless of whether it was initiated from within the communication application 108 or outside of the communication application 108, the communication receipt module 402 attempts to connect the voice communication (e.g., call) or deliver the text communication. A log entry may be created in a communication tog storage 404 by the communication receipt module 402 to record receipt of the communication request or the communication attempt. The log entry may include one or more of a start time of the communication, an end time of call, a duration of call, the actual message or a derivative thereof, and a number of the destination.

The communication details in the notification are compared to the entries in the communication log for the user device 106 from the communication log storage 404 in operation 506. In an example embodiment, the communication log access module 306 accesses a communication log in the communication log storage 404 of the carrier system 110 to obtain information corresponding to the entries. If an entry in the communication log matches the communication details in the notification in operation 508, then the communication corresponding to that entry is determined to be initiated from within the communication application 108 in operation 510. However, if an entry in the communication log does not match any communication details in the notification in operation 508, then the communication corresponding to that entry is determined to be initiated from outside the communication application 108 in operation 512. In example embodiments, a match is determined based on, for example, a communication start time or end time being within a threshold of a time indicated by the notification, a communication duration is within a threshold of a time or communication length indicated by the notification, the actual message or its derivative (such as a hash) being the same, or a number of the destination is the same in both the entry and the notification.

It is noted that the operations of the method 500 may be performed in a different order. For example, the communication request may be received (operation 504) prior to receiving the communication notification (operation 502). This may occur, for example, when the notification is provided with a batch of communications over a period of time.

Furthermore, some of the operations of the method 500 may be optional or modified or other operations added. For example, the communication may be dropped or not connected if a match is not determined in operation 510 which indicates that the communication is initiated from outside the communication application 108.

Figure 6:
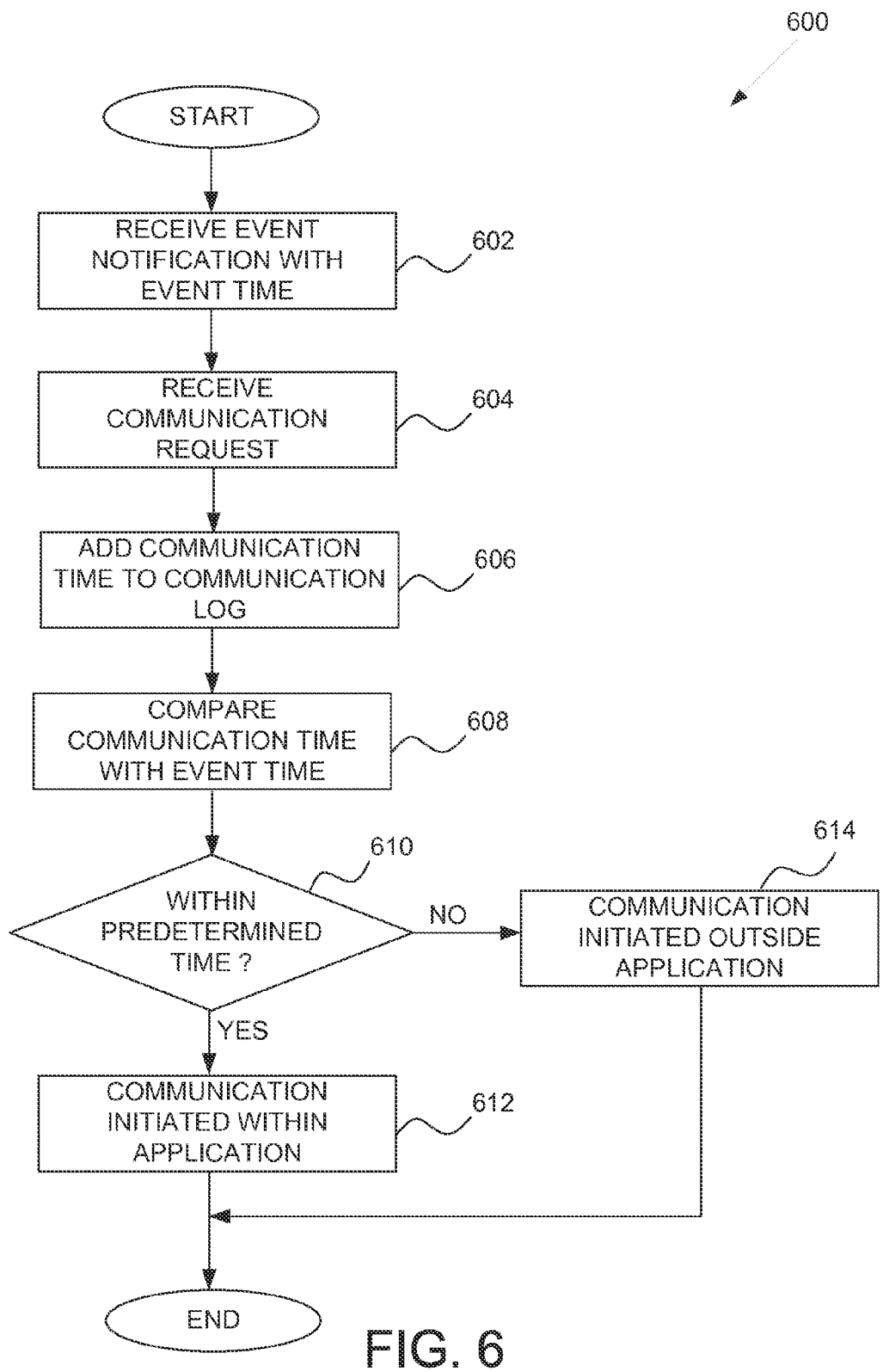
FIG. 6 is a flow diagram of another example method for determining whether the communication is initiated from within the communication application.

FIG. 6 is a flow diagram of another example method 600 for determining whether the communication is initiated from within the communication application 108. The operations of the method 600 may be performed by a combination of the service provider system 102 and the carrier system 110 which may be embodied on one or more servers. In operation 602, the notification receipt module 302 receives a notification from the user device 106. In the present embodiment, the notification is an event notification that comprises a listing of one or more events and their corresponding times that occurred within the communication application 108. In example embodiments, the notification may be sent as a web request, or SMS request, or email to the notification receipt module 302.

In operation 604, a communication request is received from the user device 106 by the communication receipt module 402 of the carrier system 110. The communication request may include a number of the destination (e.g., callee or a message recipient) and an identifier of the user device 106 (e.g., a number of the user device 106). In an embodiment where communications are completed (e.g., connected or sent) regardless of whether it was initiated from within the communication application 108 or outside of the communication application 108, the communication receipt module 402 attempts to connect the voice communication (e.g., call) or deliver the text communication. A log entry may be created in a communication log storage 404 by the communication receipt module 402 to record receipt of the communication request or the communication attempt in operation 606 that may include a time of the communication request.

The entries in the communication log for the user device 106 may be accessed by the service provider module 102 and compared to the event notification to determine if a communication occurred or was initiated within a predetermined time period or window (e.g., within five minutes) before or after a time recorded for an event indicated in the notification in operation 608. If an entry in the communication log storage 404 occurred within the predetermined time window of an event in operation 610, then the communication corresponding to that entry is determined to be initiated from within the communication application 108 in operation 612. However, if an entry in the communication log storage 404 occurs outside of the predetermined time window of an event in operation 610, then the communication corresponding to that entry is determined to be initiated from outside the communication application 108 in operation 614. The predetermined time window may vary based on the event. For example, communication requests received within 1 minute before or after accessing a dialer function or within five minutes of opening the communication application maybe deemed to be initiated from within the communication application.

It is noted that the operations of the method 600 may be performed in a different order. For example, the communication request may be received (operation 604) prior to receiving the event notification (operation 602). This may occur, for example, when the notification is provided over a period of time and may indicate one or more events.

Furthermore, some of the operations of the method 600 may be optional or modified. For example, creation of a log entry (operation 606) that is used to compare to events in the event notification in real-time may not be needed. That is, timing of events may be compared to the communication request that is received in operation 604 in real-time. Additionally in these embodiments, the communication may be dropped or not connected if the communication is not within the predetermined time of an event occurring within the communication application 108 in operation 610 which indicates that the communication is initiated from outside the communication application 108.

It is further noted that while events discussed above are with respect to communication-initiating events (e.g., opening a dialer, opening the communication application 108, accessing a chat window), alternatively, the events may be exit events. In embodiments where the events are exit events, if a communication is made within a predetermined time after the exit event, then the communication may be determined to be initiated from outside of the communication application 108.

While example embodiments provide a determination that a communication is not initiated from inside the communication application 108 when no notification is received from the user device 106, in some cases, this determination may be suspended when no connectivity is detected with the user device 106. For example, the user device may be out of service area and cannot send an SMS, e-mail, or a web request. In these cases, the service provider system 102 may not assume that a communication received at the carrier system 110 was not initiated from within the communication application 108 and hence the service provider system 102 may not provide instructions to drop the call and may not send a notice to the user. The service provider system 102 may determine that the user device 106 has no connectivity, for example, by sending a "ping" message to the user device 106 and awaiting a response. If no response is received, then the user device 106 may be deemed to have no connectivity.

Furthermore, while example embodiments have been discusses whereby the notifications received from the user device 106 comprise communication details for communications that are initiated from within the communication application 108, alternative embodiments may contemplate embodiments where the notification may comprise communication details for communications initiated from outside the communication application 108 as well. Similarly, alternative embodiments may contemplate embodiments where the notification may comprise events of other applications that occur outside of the communication application. For example, some user devices 106 may have an operating system that allows the communication application 108 to detect activities, such as communication, that are initiated outside of the communication application 108. This is a direct notification of a communication or event that is initiated from outside of the communication application 108.

Figure 7:
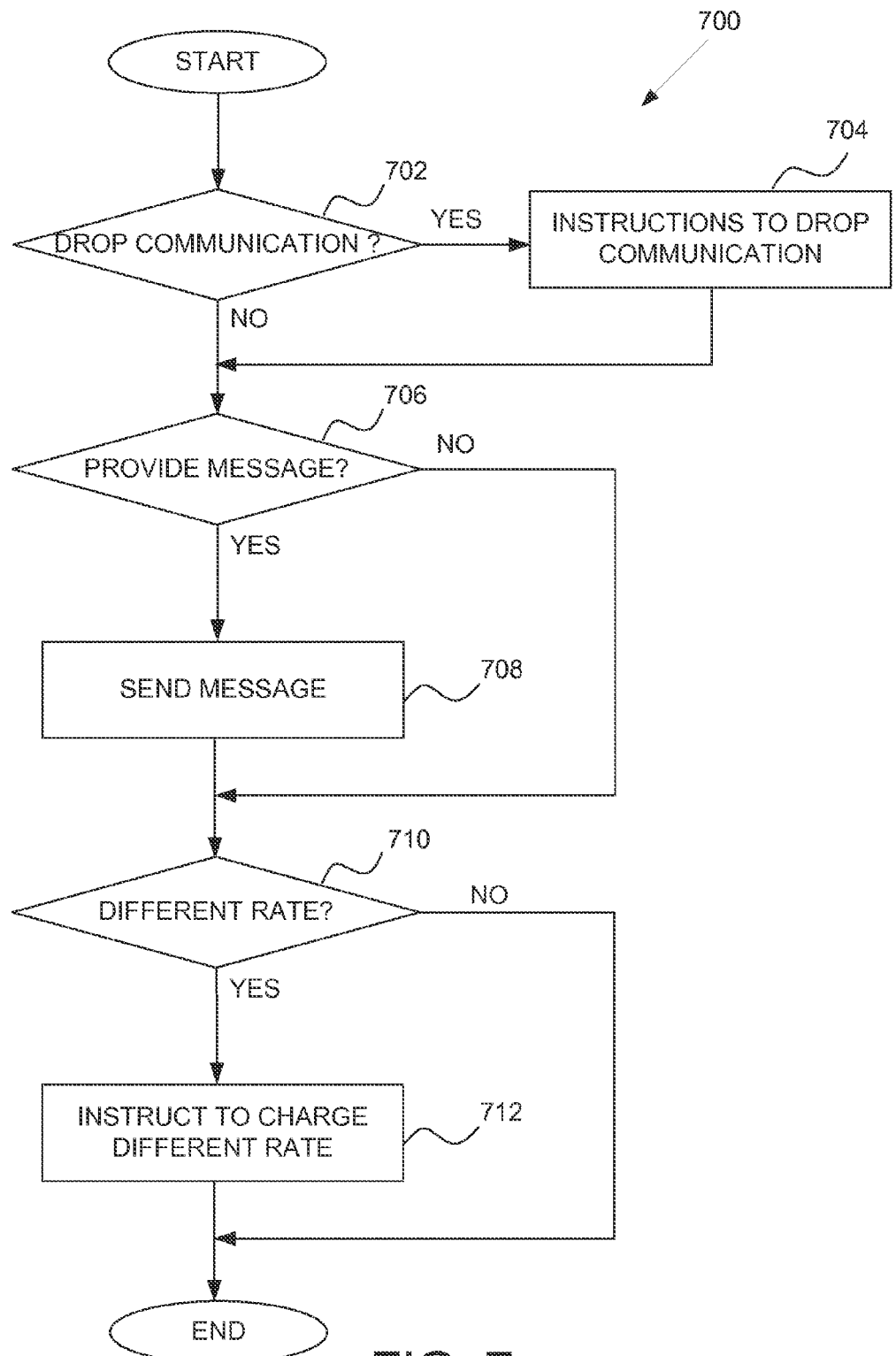
FIG. 7 is a flow diagram of an example method for managing a communication that is attempted from outside the communication application.

FIG. 7 is a flow diagram of an example method 700 for managing a communication that is attempted from outside the communication application 108. When a communication is determined to be initiated from outside the communication application 108 (e.g., operations 414, operation 514), the service provider system 102 may instruct the carrier system 110 to drop the communication, provide messages to the user of the user device 106, instruct the carrier system 110 to charge a different rate for the communication (e.g., a higher rate for communications initiated from outside the communication application 108), or any combination of these. As such in operation 702, a determination is made as to whether to drop the communication that is determined in real-time to be initiated from outside of the communication application 108. Some service provider systems 102 may determine to automatically drop the communication, while others may have conditions for dropping the communication, and others still will permit the communication to proceed from outside of the communication application 108. The conditions may be based on, for example, the number of communications initiated by the user from outside the communication application 108 exceeding a predetermined threshold (e.g., the user may be allowed to initiate five communications from outside the communication application per month). If a determination is made to drop the communication in operation 702, then instructions to drop the communication are provided to the carrier system 110 in operation 704. In some embodiments, prior to dropping the communication, a message may be provided to the user (e.g., an audio message played to the user or a text message sent to the user) informing the user the reason for dropping the communication.

In operation 706, a determination is made as to whether to provide a message to the user of the user device 106 that is attempting or has made a communication from outside of the communication application 108. If a message should be sent, then in operation 708 the message module 312 generates and sends the message to the user. In some cases, the message may indicate that the communication was dropped and that a future communication should be initiated using the communication application 108. Alternatively, the message module 312 may provide a message to the user device 106 indicating that a particular communication was initiated outside of the communication application 108 and suggest that future communications be initiated using the communication application 108. Further still, the communication may indicate that a particular communication was initiated outside of the communication application 108 and that a higher rate will be charged. The message may be sent, for example, using SMS, e-mail, USSD, voicemail, or a real-time audio message played on the call. In some embodiments, a determination of whether a predetermined number of messages within a particular time period has been sent is made. The message module 312 may refrain from providing any further messages in response to the predetermined number of messages being exceeded.

In operation 710, a determination is made as to whether to charge the user a different rate for conducting the communication from outside the communication application 108. In some embodiments, criteria may be reviewed to determine whether the user should be charged a different rate. For example, the user may be allowed to initiate a predetermined amount of communications (e.g., three) from outside the communication application 108 over a period of time (e.g., one billing cycle) before the service provider system 102 will determine to charge a different rate (e.g., charge a higher rate).

It is noted that while the embodiment of FIG. 7 makes a determination to charge a different rate based on the communication being initiated from outside the communication application 108, it an alternative embodiment, the service provider system 102 may determine to charge a different rate for communications initiated using the communication application 108. For example, communications initiated from within the communication application 108 may be charged a lower rate (e.g., versus a standard rate).

If a different rate is to be charged, then in operation 712, instructions are sent to charge the different rate. In example embodiments, the service provider system 102 may send instructions to the carrier system 110 (or a billing department associated with the carrier system 110) to charge the different rate for the communication that was initiated from outside of the communication application 108.

Figure 8:
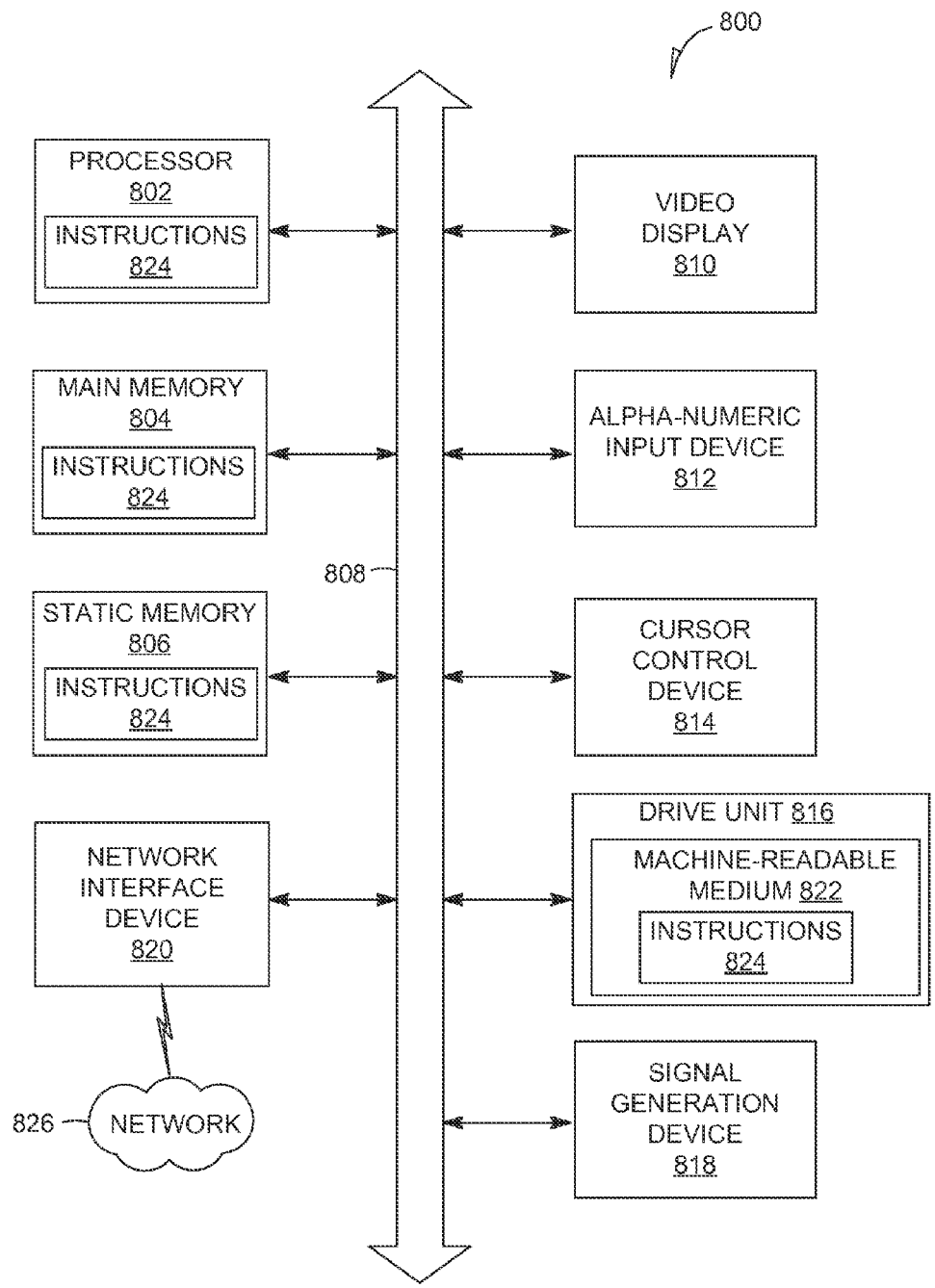
FIG. 8 is a simplified block diagram of a machine in an example form of a computing system within which a set of instructions for causing the machine to perform any one or more of the methodologies discussed herein may be executed.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software, a program, an application, un applet, an app, or other executable code) for causing the machine 800 to perform any one or more of the methodologies discussed herein may be executed. in alternative embodiments, the machine 800 operates as a stand-alone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (MC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED)

display, a liquid crystal display (LCD), a projector, or a cathode ray tube (CRT)). The machine 800 may also include an alpha-numeric input device 812 (e.g., a keyboard), a cursor control device 814 (e.g., a mouse, a touchpad, trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820.

As used herein, the term "memory" refers to a tangible machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually, or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving a communication, at a service provider, initiated from a device of a user;
   determining whether a notification is received from a communication application on the device of the user;
   based on the notification being received from the device of the user, determining, using a hardware processor, whether the notification provides an indication that the communication was initiated using the communication application, the notification indicating an event initiated within the communication application and a time of the event, the determining of whether the notification provides the indication that the communication was initiated from within the communication application being based on whether a time of the communication is within a threshold time of the time of the event; and
   performing an action in response to the communication being initiated from outside the communication application.

2. The method of claim 1, wherein the action performed in response to the communication being initiated from outside the communication application comprises providing a notice to the user.

3. The method of claim 2, wherein the providing the notice to the user comprises at least one selection from the group consisting of dropping the communication, sending an SMS, sending an email, sending a USSD message, sending a notification message, and playing an audio message.

4. The method of claim 1, wherein the operation performed in response to the communication being initiated from outside the communication application comprises charging the user a different rate than a rate charged for initiating the communication using the communication application.

5. The method of claim 1, wherein the event comprises at least one selection from the group consisting of opening the communication application, exiting the communication application, and performing a task within the communication application, the task comprising at least one selection from the group consisting of entering digits, dialing a number, composing a text communication, opening a dialer, and pressing a button.

6. The method of claim 1, wherein the time of the event is contained within the notification or is determined based on a time the notification was received by the service provider.

7. The method of claim 1, further comprising
accessing communication details of the communication received at the service provider;
determining that the communication is initiated from within the communication application based on the notification comprising communication information of an application communication that is initiated from within the communication application, the communication information of the application communication matching the communication details of the communication.

8. The method of claim 7, wherein the communication information of the application communication comprises at least one selection from the group consisting of a number of a destination, communication duration, a communication start time, a derivative of a communication message, a communication message, and communication end time.

9. The method of claim 7, wherein a start time of the application communication is contained within the notification or is determined based on a time the notification was received by the service provider.

10. The method of claim 7, wherein the communication information of the application communication is determined to match the communication details of the communication based on the communication information and communication details being within a threshold difference.

11. The method of claim 1, further comprising refraining from concluding that the communication was initiated from outside the communication application based on not receiving the notification from the user device of the user while the user device is disconnected from the Internet.

12. The method of claim 11, further comprising determining whether the user device is connected to the Internet by pushing a message to the user device and awaiting a successful delivery confirmation.

13. The method of claim 1, wherein the determining whether the notification provides the indication that the communication was initiated from outside the communication application comprises determining that the notification comprises an outside user activity performed outside the communication application and a time of the outside user activity, wherein the time of the communication is within a threshold time of a time of the outside user activity.

14. The method of claim 1, further comprising:
accessing communication details of the communication received at the service provider, wherein the notification comprises communication information of a non-application communication that is initiated from outside the communication application, wherein the non-application communication is determined to be initiated from outside the communication application based on the communication information of the non-application communication in the notification matching the communication details of the communication.

15. The method of claim 1, further comprising instructing the communication application to periodically send the notification in response to a scheduled task or via a push message.

16. The method of claim 1, wherein the notification is received via SMS, Internet, or email.

17. The method of claim 1, further comprising:
determining whether a predetermined number of notices within a time period has been sent; and
refraining from providing the notice in response to the predetermined number of notices within the time period being sent.

18. The method of claim 1, wherein the communication comprises a voice communication or a text communication.

19. A non-transitory machine-readable medium storing instructions which, when executed by the at least one processor of a machine, cause the machine to perform operations comprising:
receiving a communication, at a service provider, initiated from a device of a user;
determining whether a notification is received from a communication application on the device of the user;
based on the notification being received from the device of the user, determining whether the notification provides an indication that the communication was initiated from within the communication application, the notification indicating an event initiated within the communication application and a time of the event, the determining of whether the notification provides the indication that the communication was initiated from within the communication application being based on whether a time of the communication is within a threshold time of the time of the event; and
performing an action in response to the communication being initiated from outside the communication application.

20. The non-transitory machine-readable medium of claim 19, wherein the action performed in response to the communication being initiated from outside the communication application comprises providing a notice to the user.

21. A system comprising:
a hardware processor of a machine;
communication receipt module to receive a communication initiated from a device of a user;
a notification receipt module to determine whether a notification is received from a communication application on the device of the user;
a match module to determine, using the hardware processor, whether the notification provides an indication that the communication was initiated from within the communication application based on the notification being received from the device of the user, the notification indicating an event initiated within the communication application and a time of the event, a determination of whether the notification provides the indication that the communication was initiated from within the communication application being based on whether a time of the communication is within a threshold time of the time of the event; and
a module to perform an action in response to the communication being initiated from outside the communication application.

22. The system of claim 21, wherein the module comprises a communication drop module that instructs dropping the communication based on the communication being made from outside the communication application.

23. The system of claim 21, wherein the module comprises a message module to provide a message indicating the communication was made from outside the communication application.

24. The system of claim 23, wherein the module comprises a billing module to charge the user a different rate than a rate charged for initiating the communication using the communication application.

25. A method comprising:
receiving a communication, at a service provider, initiated from a device of a user;
determining whether a notification is received from a communication application on the device of the user;
based on the notification being received from the device of the user, determining, using a hardware processor, whether the notification indicates that the communication was initiated using the communication application;
accessing communication details of the communication received at the service provider;
determining whether the communication was initiated from within the communication application based on whether the notification comprises communication information of an application communication initiated from within the communication application whereby the communication information of the application communication matches the communication details of the communication for the communication initiated from within the communication application; and
performing an action in response to the communication being initiated from outside the communication application.

26. A method comprising:
receiving a communication, at a service provider, initiated from a device of a user;
determining whether a notification is received from a communication application on the device of the user;
based on the notification being received from the device of the user, determining, using a hardware processor, whether the notification provides an indication that the communication was initiated using the communication application;
accessing communication details of the communication received at the service provider, the notification comprising communication information of a non-application communication that is initiated from outside the communication application, the non-application communication being determined to be initiated from outside the communication application based on the communication information of the non-application communication in the notification matching the communication details of the communication; and
performing an action in response to the communication being initiated from outside the communication application.

27. A non-transitory machine-readable medium storing instructions which, when executed by the at least one processor of a machine, cause the machine to perform operations comprising:
receiving a communication, at a service provider, initiated from a device of a user;
determining whether a notification is received from a communication application on the device of the user;
based on the notification being received from the device of the user, determining whether the notification provides an indication that the communication was initiated from within the communication application;
accessing communication details of the communication received at the service provider;
determining whether the communication is initiated from within the communication application based on whether the notification comprises communication information of an application communication that is initiated from within the communication application whereby the communication information of the application communication matches the communication details of the communication for the communication initiated from within the communication application; and
performing an action in response to the communication being initiated from outside the communication application.

28. A non-transitory machine-readable medium storing instructions which, when executed by the at least one processor of a machine, cause the machine to perform operations comprising:
receiving a communication, at a service provider, initiated from a device of a user;
determining whether a notification is received from a communication application on the device of the user;
based on the notification being received from the device of the user, determining whether the notification provides an indication that the communication was initiated from within the communication application;
accessing communication details of the communication received at the service provider, the notification comprising communication information of a non-application communication that is initiated from outside the communication application, the non-application communication being determined to be initiated from outside the communication application based on the communication information of the non-application communication in the notification matching the communication details of the communication; and
performing an action in response to the communication being initiated from outside the communication application.

29. A system comprising:
a hardware processor of a machine;
communication receipt module to receive a communication initiated from a device of a user;
a notification receipt module to determine whether a notification is received from a communication application on the device of the user;
an access module to access communication details of the communication received at the service provider;
a match module to determine, using the hardware processor, whether the notification provides an indication that the communication was initiated from within the communication application based on the notification being received from the device of the user and to determine whether the communication is initiated from within the communication application based on whether the notification comprises communication information of an application communication that is initiated from within the communication application whereby the communication information of the application communication matches the communication details of the communication for the communication initiated from within the communication application; and
a module to perform an action in response to the communication being initiated from outside the communication application.

30. A system comprising:
a hardware processor of a machine;
communication receipt module to receive a communication initiated from a device of a user;

a notification receipt module to determine whether a notification is received from a communication application on the device of the user;

an access module to access communication details of the received communication;

a match module to determine, using the hardware processor, whether the notification provides an indication that the communication was initiated from within the communication application based on the notification being received from the device of the user, the notification comprising communication information of a non-application communication that is initiated from outside the communication application, the non-application communication being determined to be initiated from outside the communication application based on the communication information of the non-application communication in the notification matching the communication details of the communication; and a module to perform an action in response to the communication being initiated from outside the communication application.

* * * * *

UNITED STATES PATENT AND TRADEMARK OFFICE
CERTIFICATE OF CORRECTION

PATENT NO. : 9,602,982 B2
APPLICATION NO. : 14/295205
DATED : March 21, 2017
INVENTOR(S) : Bhavin Turakhia Page 1 of 2

It is certified that error appears in the above-identified patent and that said Letters Patent is hereby corrected as shown below:

In Column 1, Line 12, delete "of" and insert --of,-- therefor

In Column 2, Line 33, delete "b" and insert --by-- therefor

In Column 4, Line 56, delete "106" and insert --108-- therefor

In Column 5, Line 33, delete "b" and insert --by-- therefor

In Column 5, Line 35, delete "108" and insert --106-- therefor

In Column 5, Line 37, delete "o" and insert --of the-- therefor

In Column 5, Line 47, before "some", insert --In--

In Column 6, Line 3, delete "108" and insert --106-- therefor

In Column 7, Line 8, delete "n" and insert --In-- therefor

In Column 7, Line 15, delete "in" and insert --In-- therefor

In Column 8, Line 12, delete "start," and insert --start-- therefor

In Column 8, Line 56, delete "tog" and insert --log-- therefor

In Column 12, Line 38, delete "un" and insert --an-- therefor

In Column 12, Line 40, delete "in" and insert --In-- therefor

In Column 12, Line 63, delete "(MC)," and insert --(RFIC),-- therefor

Signed and Sealed this
Thirty-first Day of July, 2018

Andrei Iancu
*Director of the United States Patent and Trademark Office*

CERTIFICATE OF CORRECTION (continued)
U.S. Pat. No. 9,602,982 B2

In Column 13, Line 4-5, before "trackball,", insert --a--

In Column 14, Line 26, delete "processors" and insert --processors)-- therefor

In Column 15, Line 58, delete "individually," and insert --individually-- therefor In Column 17, Line 7, in Claim 7, delete "comprising" and insert --comprising:-- therefor